March 18, 1969  H. M. GEYER  3,433,089

CABLE TENSION REGULATOR

Filed March 13, 1967

INVENTOR

HOWARD M. GEYER

BY Stephen M. Mihaly

ATTORNEY

United States Patent Office 3,433,089
Patented Mar. 18, 1969

3,433,089
CABLE TENSION REGULATOR
Howard M. Geyer, Dayton, Ohio, assignor to Pneumo Dynamics Corporation, Cleveland, Ohio, a corporation of Delaware
Filed Mar. 13, 1967, Ser. No. 622,653
U.S. Cl. 74—501.5                12 Claims
Int. Cl. F16f 3/00

ABSTRACT OF THE DISCLOSURE

Two rotatable cable-anchoring sectors having hub sections respectively coupled by roller clutches to an input upon relative rotation in both directions, each clutch including diametrically opposite rollers within a sector hub section backed by a floating block and being spring-wedged between the block ends and the sector. Interconnected actuator arms shift with the relative rotation to unwedge the rollers of one clutch while releasing the rollers to wedging in the other for the direction responsive coupling of the sectors.

---

Figure 1:
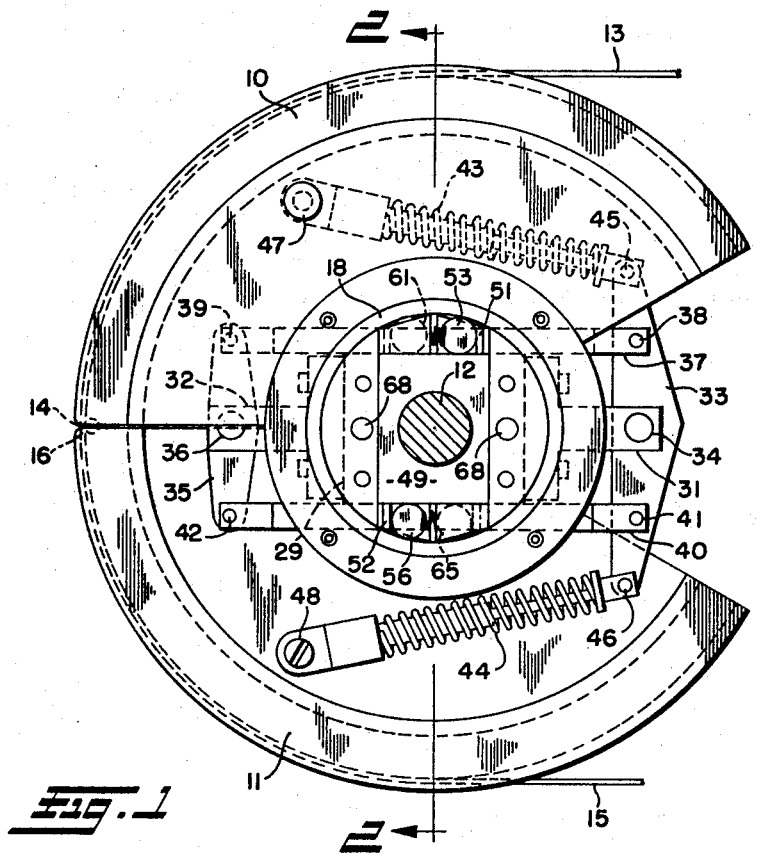

This invention relates to an improved regulator of the type applied to maintain substantially constant tension in paired control lines or cables, such as used for actuation of aircraft control surfaces, notwithstanding changes in temperature and other operating conditions which would otherwise cause an increase or decrease in the desired rig load or tension.

Regulators on this order which have been used for the indicated purpose are usually comprised of a pair of relatively rotatable sectors to which the cables are respectively attached, an input control assembly, and compensating spring means interposed between such assembly and the two sectors. The compensating spring means serves normally to turn the sectors in opposite directions on the same axis and thereby maintain the cables under the predetermined rig tension and, in this combination, the input assembly includes locking means for locking the sectors against relative turning when a control force is applied to one or the other of the cables, for example, to cause displacement of the aircraft surface controlled by the cables. In early regulators of this class, the locking means employed operated to lock both of the sectors with each control force application, and it was found that slack could and would at times result in the untensioned cable due to some stretching of the cable transmitting the control force, with resulting impairment of the response of the regulator and danger of fouling of the control lines. Regulators were accordingly proposed in which any such slack is immediately taken up, and it is a primary object of the present invention to provide an improved form of cable tension regulator on this last order.

It is a further object to provide such a regulator in which the slack take-up is accomplished by the tension regulating spring means and the input assembly includes novel sector locking means for the control force application to the cables.

It is a further object of the invention to provide such a regulator of improved load carrying capability.

Another object is to provide roller clutch mechanism which will, as in such a cable regulator, lock an input member rotatively to two output members respectively with relative rotation of the input member in both directions.

It is a still further object of the invention to provide, in such an assembly of input and output members, roller clutch means having two locking rollers operatively associated with each output member in combination with means for equally distributing therebetween the load applied to effect the locking of such output member.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 2:
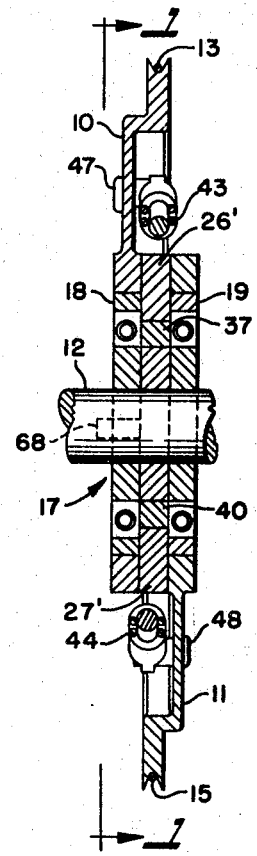
Figure 3:
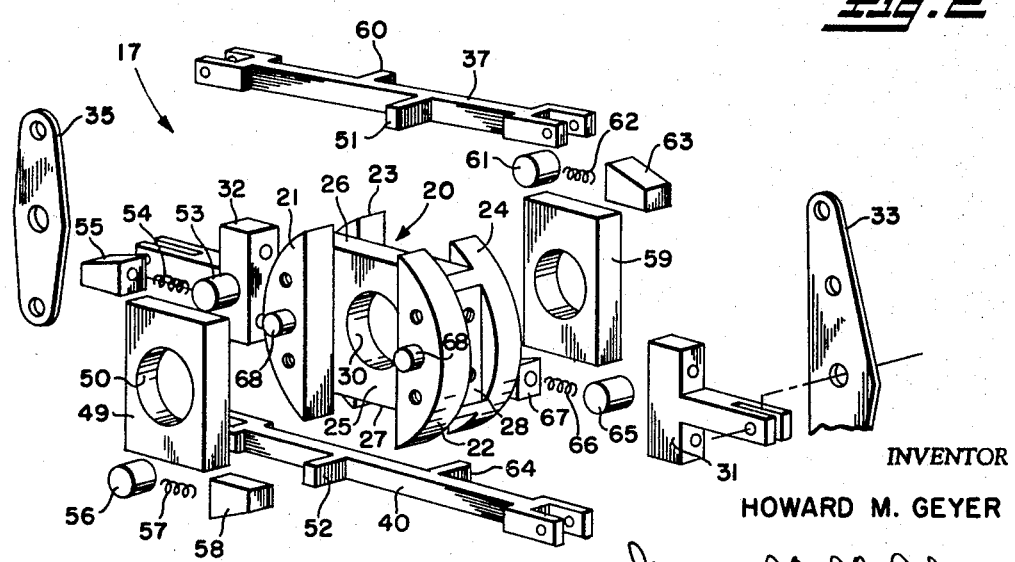

In said annexed drawing:
FIG. 1 is a side elevational view, with certain parts in section, of a cable tension regulator in accordance with the present invention;
FIG. 2 is a transverse cross-sectional view of the regulator as indicated by the line 2—2 in FIG. 1; and
FIG. 3 is an exploded perspective view of the input control assembly of such regulator.

Referring now to the drawing in detail, the regulator embodiment illustrated comprises first and second sectors, 10, 11 supported rotatively on a common shaft 12. As evident from FIG. 2, these sectors are allochiral and oppositely mounted on the shaft, with the rim of each grooved to receive a control line or cable.

A first such cable 13 thus extends over the rim of the sector 10 to an anchor 14 therewith at the distal end, and a second cable 15 is similarly extended over the sector 11 to an end anchor 16. As noted in the foregoing, this cable pair may be applied to control a movable aircraft surface, with illustration of such a common use not needed however for full understanding of the present improvements.

The support of the two sectors on the shaft 12 is, more particularly, provided by a common hub assembly designated generally by reference numeral 17 the end portions of which serve, as will be more fully set forth below, as bearing surfaces for outer races 18, 19 of the sectors 10 and 11, respectively. The ends of the hub assembly are shown in the planes of the respective outside surfaces of the sectors 10, 11, which are axially spaced apart as also shown. With particular reference to FIG. 3, the hub assembly 17 comprises an input member 20 which is generally cylindrical but shaped to form two segments 21, 22 in uniformly spaced opposition at one end of the member and two further segments 23, 24 in similar form and arrangement at the other end. The intermediate portion 25 of the member 20 is peripherally relieved to provide a first pair of opposed parallel slots 26, 27 and a second pair of slots 28, 29 in right angle, non-intersecting relation to the first pair. This center or intermediate portion is further provided with a hole 30 of a diameter such that the input member has a light press fit on the shaft 12, while the segments 21, 22 and 23, 24 are sized to serve as above indicated respectively as bearing surfaces for the sector outer races 18, 19.

A spring lever mount 31 of T-shape is attached to the input member 20 with its base partially received in the slot 28, and an arm mount 32 of identical form is attached in like manner to same member 20 at the opposed slot 29. The projecting leg of the spring lever mount 31 is bifurcated and a spring lever 33 is attached thereto on a pivot 34. At the other side, the leg of arm mount 32 is also bifurcated and mounts an equalizing arm 35 on a pivot 36. A first parallelogram arm 37 extends from a pivot connection 38 at a point spaced inwardly from one end of the spring lever 33 through the slot 26 in the input member 20 to a pivotal connection 39 at its other end with one end of the equalizing arm 35. A second parallelogram arm 40 is pivotally connected at its ends 41, 42 similarly to the spring lever 33 at a corresponding point inward of the other end thereof to the other end of the equalizing arm 35, with this arm extending through the slot 27 of the input member 20. Segmental guides 26', 27' are interposed as shown between the races 18, 19 and respectively opposite slots 26, 27, outward of the parallelogram arms 37, 40.

Compression springs 43 and 44 are pivotally connected at 45 and 46 to the respective ends of the spring lever 33, with the other end of the spring 43 connected to an anchor 47 on the sector 10 and the other end of the spring 44 extending to an anchor 48 on the sector 11. The parallelogram arms 37, 40 are free to move longitudinally in the slots of the input member 20 in which they are received and between the two sectors, and it will be appreciated that the points of connection thereof to the spring lever 33 are at the same spacing as the other end connections to the equalizing arm 35, so that a closed parallelogram linkage is formed and the arms maintained in parallelism in experiencing any change of the angular relation of the arms. The compression springs 43, 44 will be selected and adjusted to provide predetermined tension in the cables 13, 15, these springs acting to turn the sectors 10, 11 in opposite directions against each other as shown in the absence of regulating tension. When the desired regulating tension is applied to the cables, the sectors of course turn in opposite directions or toward each other to an intermediate position depending upon the rig load and, with this condition of adjustment, lengthening and shortening of the cables due to temperature changes and the like are compensated by self-adjustment of the springs.

The input assembly 17 also comprises roller clutch means for locking the sectors respectively upon turning in both directions, whereby a control force is applied to one or the other of the cables. Such clutch mechanism includes a block 49 in the space between the input member segments 21, 22 and having a center clearance hole 50 which is of greater diameter than the shaft 12, the latter passing therethrough, so that the block is floating or has a degree of movement transversely with respect to the shaft. The length of the block is such that its ends are spaced inwardly from the ends of the adjacent segments 21, 22, with the block being of the same thickness or axial extent as the latter and defining cooperably therewith diametrically opposed recesses at the ends or at the periphery of the assembly between these segments. The two parallelogram arms 37, 40 at their sides adjacent these recesses are formed with release fingers 51, 52 which project into the same but respectively at opposite ends. In the orientation of the assembly shown in the drawing, the arm 37 can be considered at the top and arm 40 at the bottom, with the release finger 51 of arm 37 thus projecting into the top recess adjacent the right hand end thereof and the bottom arm release finger 52 disposed in this condition at the left end of the bottom recess. A top roller 53 is disposed freely in the top recess and urged against the release finger 51 by a coil spring 54 at the opposite side and a spring guide 55 extending to the other end of the recess. In corresponding manner, a bottom roller 56 is disposed in the bottom recess against the release finger 52 and biased by a spring 57 and guide 58, with these two rollers at one side or one end of the hub assembly accordingly biased in the same rotative direction.

At the other end of the input assembly, there is a further floating block 59 arranged in like manner and the top parallelogram arm 37 has a further release finger 60 extending into a similar recess at this side but at the end thereof opposite the end which corresponds to that adjacent the other side release finger 51. A roller 61 is biased against the finger 60 by a spring 62 and guide 63, while the bottom parallelogram arm 40 has a further release finger 64 extending into the opposite end of the bottom recess in which there is a roller 65, bias spring 66 and guide 67. It will accordingly be seen that there are two rollers associated with each sector at the outer race thereof, with the pairs relatively reversed. Each roller is urged into the wedge formed by the equilizing block and outer race between which it is interposed by its biasing spring, with the release fingers operative to release the rollers from locked position as further explained below.

The input member 20 is shown as having driving dowels 68 projecting to one side for coupling to a control lever or the like, not shown, directly or indirectly, and, when a control force is applied, unequal tensioning of the cables and relative movement of the sectors 10, 11 occurs with consequent unequal forces in the regulating springs 43, 44. Such a difference in the spring force rocks the spring lever 33 on its center pivot 34, and this causes the parallelogram arms 37, 40 to move longitudinally oppositely, with the fingers at one side releasing the associated rollers for the wedging action and, at the other side, pulling the rollers free from such action. It will be understood that these release fingers are located so that only one sector can thus be locked at a time, with the shaft and the thus locked sector acting rigidly for as long as the input torque is maintained. At each side, the floating block 49 or 59 distributes the load equally between the two rollers and they lock only in pairs, with this distribution adding to the load carrying capability of the design.

With further regard to the regulation action, it will now be seen that if the time tension decreases, the sector races 18, 19 will rotate in the direction to keep all of the rollers from wedging, whereas an increase in the line tension may cause a pair of rollers momentarily to wedge due to friction. In this last case, the input then tends to rotate with the wedged rollers until one engages a release finger and sufficient force is built up to unwedge it, with such locking and unlocking action continuing until the cable and spring loads are in equilibrium.

It will be further appreciated that the disclosed regulator is protected against slack. For example, with the sectors 10, 11 at some angular separation under the applied rig tension, a control pull on the cable 13 by sector 10 in a counterclockwise direction sufficient to cause slack in the other cable 15 will result in immediate clockwise movement of the sector 11 by the spring 44 to take up such slack.

The new regulator design will thus be seen to comprise basically an input member selectively coupled rotatively to one or the other of two output members through roller clutch mechanism in which there is a cam surface, at least one roller for each output member for wedging between the same and the cam surface upon relative rotation thereof, and a roller release device for releasing one roller to such wedging action while freeing the other from such action. This form of locking with only two rollers for the two output members is of course doubled in the preferred double roller embodiment, with the added feature of equal distribution of the load to realize the noted increased capacity.

Other modes of applying the principle of the invention may be employed, change being made as regards the details described, provided the features stated in any of the following claims or the equivalent of such be employed.

I, therefore, particularly point out and distinctly claim as my invention:

1. A cable tension regulator comprising a hub assembly, a pair of cable-receiving sectors supported on said hub assembly for rotation with and relative to said assembly, the sectors being normally free to rotate on the assembly, regulating spring means for biasing the sectors in opposite rotative directions to maintain predetermined tension in the cables connected respectively thereto, and clutch means for selectively locking the sectors to the hub assembly for rotation therewith, said clutch means including first and second locking members respectively associated with the two sectors interiorly thereof and commonly with the hub assembly, said first member being driven into locking engagement between the hub assembly and one sector upon predetermined relative rotation in one direction, with reverse relative rotation resulting in freeing of said first member and hence said one sector and locking of the other sector by comparable engagement of the second member.

2. A cable tension regulator as set forth in claim 1, wherein the clutch means also comprises release means normally maintaining the locking members inoperative and being responsive to such relative rotation to release one of the locking members to the locking engagement thereof while restraining the other from such engagement.

3. A cable tension regulator as set forth in claim 1, wherein the locking members are wedges which are interposed between oppositely converging surfaces respectively of the two sectors and the hub assembly.

4. A cable tension regulator as set forth in claim 3, wherein said wedges are biased by spring means in their respective locking directions, and the clutch means comprises release means for releasing one of the wedges to the locking action while freeing the other from such action.

5. A cable tension regulator as set forth in claim 4, wherein said wedges are rollers.

6. A cable tension regulator as set forth in claim 1, wherein the clutch means includes a pair of locking members associated with each sector interiorly thereof, and commonly with the hub assembly, and means for distributing loading on the two members of each pair equally therebetween.

7. A cable tension regulator as set forth in claim 6, wherein the clutch means also comprises release means normally maintaining the pairs of locking members inoperative and being responsive to such relative rotation to release one pair to the locking action while restraining the other therefrom.

8. A cable tension regulator as set forth in claim 7, wherein the locking members are spring-biased rollers interposed between races on the sectors and cooperable wedge-defining surfaces of the hub assembly, with such surfaces associated with each roller pair being opposed on a common support having limited degree of movement in the assembly for equally distributing applied load between the rollers of such pair.

9. A cable tension regulator as set forth in claim 8, wherein said release means comprises a pair of parallelogram arms having release figures engaging the rollers, the two arms experiencing comparable but opposite movement upon the occurence of such relative rotation and each acting on two rollers respectively associated with the sectors.

10. In combination with a hub assembly including a drive input member and a relatively rotatable output member supported on said input member, clutch mechanism for locking the input and output members to rotate together in response to predetermined relative rotation thereof, said clutch mechanism comprising an outer race section interiorly on said output member, the input member having bearing surfaces cooperating with said outer race in the support of the output member, said bearing surfaces being provided by the arcuate peripheries of spaced-apart segment formations of the input member, a wedge-forming member between such segment formations and having end surfaces in chordal relation to the bearing surfaces and hence said outer race, and a roller interposed between each end surface of said wedge forming member and the outer race for locking the input and output members upon relative rotation thereof in one direction, with the wedge forming member being supported in the assembly for limited transverse shifting effective to distribute loading equally between the two rollers.

11. The combination set forth in claim 10, wherein a second output member is supported in like manner on the input member and has associated therewith a second wedge-forming member and pair of rollers for comparable locking action, but with such second roller pair operative to lock the second output member upon relative rotation in the direction opposite to that effective to lock the first-named output member, the several rollers being spring-biased in locking direction, and release means being provided for releasing the rollers of one pair to the locking action while freeing the other pair from such action.

12. The combination set forth in claim 11, wherein the release means comprises parallelogram arms interconnected for equal and opposite movement responsive to such relative movement, with each arm acting upon two non-paired rollers to effect such release and freeing thereof.

References Cited

UNITED STATES PATENTS

| | | | |
|---|---|---|---|
| 2,992,568 | 7/1961 | Benkovsky et al. | 74—501.5 |
| 3,277,738 | 10/1966 | Glauser et al. | 74—501.5 |
| 3,316,775 | 5/1967 | Wrighton et al. | 74—501.5 |
| 3,352,515 | 11/1967 | Albright. | |

DONLEY J. STOCKING, *Primary Examiner.*

L. H. GEREN, *Assistant Examiner.*

U.S. Cl. X.R.

192—45